Aug. 24, 1965   D. B. TODD ETAL   3,202,647
ELASTOMER RECOVERY PROCESS
Filed Nov. 19, 1962
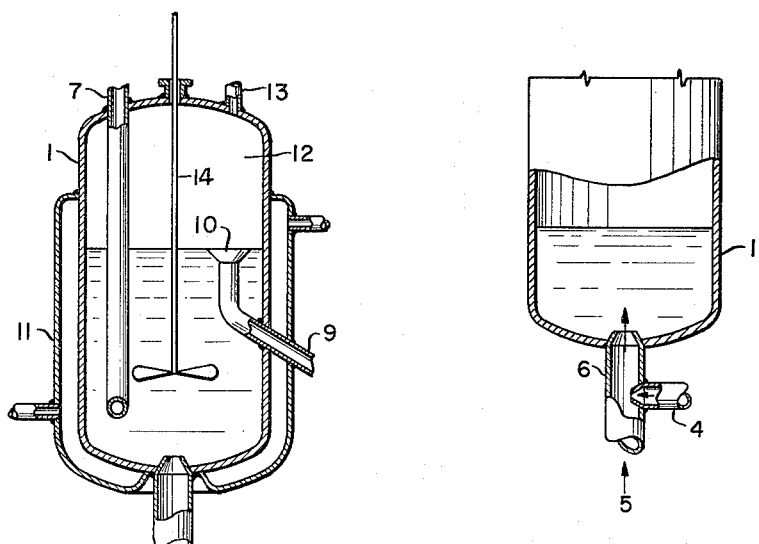
FIG. 3
FIG. 1
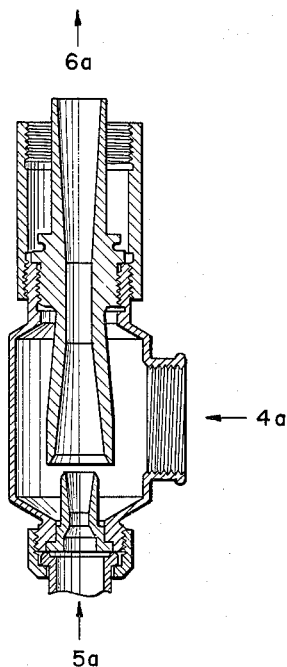
FIG. 2
INVENTORS:
DAVID B. TODD
WILLIAM R. KEELER
RONALD C. BALFOUR
BY: *William H. Myers*
THEIR AGENT

3,202,647
ELASTOMER RECOVERY PROCESS
David B. Todd and William R. Keeler, Berkeley, and Ronald C. Balfour, Torrance, Calif., assignors to Shell Oil Company, New York, N.Y., a corporation of Delaware
Filed Nov. 19, 1962, Ser. No. 238,663
6 Claims. (Cl. 260—94.7)

This invention relates to improved processes for the recovery of elastomers. More particularly, it relates to the recovery of elastomers from hydrocarbon solutions thereof, said recovered elastomers exhibiting improved driability characteristics.

Synthetic elastomers may be produced from conjugated dienes and from certain combinations of olefins such as ethylene-propylene and ethylene-butylene copolymers. The more useful elastomers of dienes are those having a high cis 1,4-content prepared from isoprene, butadiene and combinations thereof. Such elastomers are particularly suitable for the manufacture of automobile and truck tires as well as for other applications such as latex, rubber cement, foam and other end uses.

Products having a high cis 1,4-content are preferably prepared by solution processes wherein the polymers dissolved in a solvent as they are formed, resulting in what is referred to as "cement." Suitable catalysts for this purpose include hydrocarbyl (alkyl) lithium catalyst such as butyl and amyl lithium as well as other normal alkyl and secondary alkyl lithiums having from 2–10 carbon atoms per alkyl radical. Polymerizations are usually conducted at temperatures ranging from 25–100° C., the quantity of catalyst employed usually ranging from about 0.03 mm. to about 2 mm. per mole of diene monomer such as isoprene.

Polybutadienes having a high cis 1,4-content are best prepared with catalysts comprising the reaction products of a transition metal compound, e.g., halide of a group IV–VIII metal and a strong reducing agent. The reducing agents may be for example, a metal compound of a group I–II metal. Other catalysts may be employed for this purpose which are known in the art. Ethylene propylene copolymers are produced by polymerizing mixtures of the monomers with a catalyst comprising the reaction product of vanadium oxy chloride and a reducing agent of the type previously described.

The polymerizations are conducted in the presence of inert liquid solvents such as hydrocarbons having from 4–7 carbon atoms per molecule, exemplified by mixtures of butylenes, amylenes, pentanes, hexanes, benzene, toluene and related mixtures such as benzene-isobutylene and the like.

Heretofore, recovery of the elastomer in a suitable form from its cement has been both difficult and unsatisfactory. The present invention provides highly suitable processes for the improved recovery of elastomers from hydrocarbon solutions thereof. A better understanding of the advantages of the invention may be had by considering some of the problems involved in the recovery processes known in the prior art.

The elastomers that are in the solution of a hydrocarbon solvent may be precipitated by adding to the solution a coagulating agent such as isopropanol, ethanol, acetone or the like, whereupon the elastomer forms as a swollen dispersed phase which settles as a semi-fluid mass. The swollen elastomer can be recovered and then dried whereby the solvent and coagulating agent are removed. Unfortunately, much of the solvent and coagulating agent are dissolved in the elastomer and these liquids heretofore could not be suitably removed. Removal of the liquids to less than about 1% by weight is necessary however or else they will cause rubber products produced therefrom to blister and weaken during vulcanization. Actually, it is best to remove the liquids to less than 0.5% by weight or lower but this has not been possible heretofore. Furthermore, when the swollen elastomers are subjected to heat during drying, they degrade and become more tacky thereby causing greater compacting and resulting in occluded liquids being still more firmly held.

By other known means, a body of rubber cement can be dispersed in water containing a surface active agent such as soap. The dispersion is then raised in temperature to an extent sufficient to remove the cement solvent by evaporation. The elastomer particles recovered from such a process, however, have the disadvantage of being in the form of discrete spherical particles which are usually hollow in form and therefore are subject to substantial retention of solvents or water which eventually exhibit the disadvantages thereof referred to hereinbefore. The products, being of such low surface area (spherical) also have relatively poor drying characteristics, requiring extensive periods of heating to drive off both residual solvent and occluded water. This is not only economically disadvantageous but also subjects the spherical particles to elevated temperatures which result in extensive degradation of the elastomer.

Now, in accordance with the present invention, a process for the recovery of a synthetic elastomer from its solution in the hydrocarbon solvents comprises the contacting of a stream of the rubber cement with high pressure steam in such a way that a highly porous "crumb" of the elastomer is substantially instantaneously formed, the cement solvents vaporizes in a flashing technique and the crumb so recovered exhibits highly desirable driability characteristics.

The high pressure steam utilized in the process of this invention preferably contacts the rubber cement in a 2-fluid nozzle which may or may not be still further modified with a liquid water injection system; or, as preferably described in U.S. Patent 3,050,113 to D. W. Rundquist. While this patent describes a preferred type of coagulation apparatus, it will be understood that other 2-fluid nozzles may be employed for this purpose as long as the steam is injected therein at a pressure in excess of about 90 p.s.i.g. and prefreably within the range of 90–140 p.s.i.g.

The high pressure steam (or steam used with hot water) functions to evaporate solvent with an "explosive" force which causes formation of a rubber crumb of small particle size and high porosity, both of which promote high driability.

FIGURES 1–3 illustrate how the process of this invention may be carried out and will be considered more fully hereinafter.

In essence, the formation of the elastomer as a crumb that is suitable for drying requires that the solvent be removed and yet leave the elastomer as discrete porous particles so that occluded water and solvent can be removed by the simple application of heat. This, however, requires that more than mere evaporation of the solvent be utilized and, while this invention is not limited by any theoretical considerations, it appears that to achieve the desired porous crumb an amount of mechanical energy must be supplied to the polymer solution in the form of the high pressure steam so that the elastomer will form as small porous discrete particles while simultaneously most if not all of the hydrocarbon solvent is vaporized. This, it is found, is successfully accomplished by the use of 2-fluid nozzles. In order to vaporize the solvent, steam or a mixture of hot water and steam may use used.

The pressure of steam entering the coagulation nozzle is a critical but variable factor dependent in part upon the solids content of the elastomer solution, the design and capacity of the coagulation nozzle, and the particular elastomer being recovered. For example, when polyisoprene is to be recovered from hydrocarbon solutions such as isopentane or mixed amylenes with steam, pressures below about 90 p.s.i.g. produce coagulated particles showing relatively poor driability characteristics. If, however, the pressure of steam entering the coagulation jet is in the order of 90–130 p.s.i.g. or even higher, the coagulated rubber crumb recovered thereby shows excellent driability characteristics. If steam pressures in excess of about 130 p.s.i.g. are utilized, the size of the elastomer crumb decreases and if the crumb is too small, a problem of material handling may arise. Further, higher pressures increase the operating costs without affording any particular advantage.

The ratio of steam to elastomer solution or more particularly, the ratio of steam to elastomer may vary but advantages are found for maintaining an optimum ratio of steam to solid elastomer in the order of at least 3 parts by weight of steam per part of polymer. Preferably, the proportion of steam to polymer is at least 1.5 times that required for vaporization of the cement solvent.

The processes used for the preparation of the elastomers form no part of this invention as such processes are known in the prior art. It should be emphasized that it is essential that the elastomers be in the form of solutions obtained in the polymerization of monomers, a hydrocarbon solvent being the solvent involved. Consequently, the solutions of the elastomer in hydrocarbon solvents are to be distinguished from emulsions wherein the elastomer exists as fine discrete particles in a nonsolvent therefor.

Referring to the drawings, FIGURE 1 generally shows the structure of a steam jet system wherein the elastomer solution enters the channel 4 and steam enters the channel 5. The total pressure at the orifice of 6 must be greater than the pressure head of the hot water in vessel 1. In a preferred design of the steam jet of FIGURE 1, the mechanical energy generated by the scheme is not anticipated in driving the coagulated elastomer formed in the area 6 to the vessel 1. Accordingly, the area 6 preferably is not more than several inches long. More preferred, the discharge end of the steam jet discharges directly into the hot water vessel shown.

FIGURE 2 shows the construction of a Penberthy steam ejector which is representative of a suitable steam ejector for the present invention. The elastomer solution enters the ejector at 4a and the steam enters at 5a. The discharge at 6a empties into the hot water vessel in the preferred embodiment.

FIGURE 3 illustrates one construction of the hot water containing vessel which received the coagulated elastomer. It may be necessary to feed hot water into the vessel if the aqueous medium supplied from the nozzle or jet is not sufficient to maintain a sufficient water level. The hot water feed may enter the vessel 1 from a pipe 7 which may be located at any suitable point. The elastomer crumb may flow out of the vessel 1 through a line 9 which may be equipped with a funnel 10. Alteratively, the elastomer crumb may leave as a slurry pumped from the bottom of a well agitated vessel (not shown). It may be desirable to have the vessel 1 equipped with a hot water jacket 11 although this is not essential. It will be seen that the vessel 1 containing the hot water may be modified as desired. Thus, it is desirable to have the vessel 1 equipped with an agitator 14 and the outlet for the elastomer slurry may be at any other suitable location. The vapor space 12 at the top of the vessel 1 will contain vaporized solvent and water vapor which leave the vessel 1 through the outlet 13. Subsequently, the vaporized solvent may be recovered and reused. It will be appreciated that the temperature in the vapor space 12 should not be too low or some of the vaporized solvent will condense and this may be controlled by merely maintaining the water temperature sufficiently high.

The two-fluid nozzle that may be employed for the purpose of this invention may be of any desired design or construction although the design shown in the Rundquist patent, U.S. 3,050,113 is preferred. A plurality of 2-fluid nozzles may be used depending upon the desired capacity in which event other design modifications may be adapted to accommodate the increased capacity. In general, the 2-fluid nozzle is operated so that the elastomer solution surrounds the aqueous medium. This operation is much simpler and less critically dependent upon pressure.

The term "2-fluid nozzle" is meant to imply that the elastomer solution is one of the fluids while the second fluid may be steam or steam and water. In the latter instance, the steam and water may be injected into the nozzle through the same aperture or may be separately injected. This is a preferred latter embodiment of the nozzle and liquid water is preferred as a carrying means for the coagulated rubber.

In actual practice, the removal of the solvent in the main coagulation vessel at a particular temperature is limited by the equilibrium that is established between the partial pressure in the vapor space and the partial pressure of the solvent being evaporated from the elastomer solution. To remove the solvent more effectively, the partial pressure may be reduced by placing the system under vacuum or by feeding an inert gas into the hot water vessel. Such techniques are more often employed when the solvent has a relatively higher boiling point as in the case of benzene or cyclohexene or where the elastomer is sensitive to elevated temperatures. Coagulation may be carried out under partial vacuum in order to remove the solvent at a more convenient lower temperature conversely with low boiling solvents such as butane, pentane, butylene or other lower boiling gaseous hydrocarbons. It may be desirable to operate the coagulation under moderate pressures in order to facilitate solvent removal by condensation with normal cooling water. For continuous elastomer recovery, it may be desired to remove the solvent in a series of stages to conserve steam. Multiple stages for solvent removal are desirable economically and technically. For example, when using relatively volatile solvents such as $C_5$ hydrocarbons, most of the solvent is flashed off from the interior of the crumb at the nozzle. However, some small amount of the solvent is dissolved in the water-bath and may pass back into the crumb as well as cause an explosion hazard in later processing stages. Hence, it is desirable to pass the crumb slurry to a second vessel where heat or reduced pressure are employed to remove this dissolved solvent. With higher boiling, such as benzene or cyclohexane, the second stage also removes the small amount of solvent still remaining in the crumb.

The invention is described in greater detail in the following examples which are presented to illustrate various embodiments of the invention.

EXAMPLE 1

Isoprene was dissolved in isopentane to give a concentration of 15% by weight of isoprene. Thereafter 2000 gallons of the solution was polymerized with lithium butyl catalyst at 55° C. The resulting solid polymer had an I.V. of 10.2 and an 88.2% concentration of the cis 1,4-addition product. The solids content of the solution was 12.0%. This solution was then coagulated using a Penberthy steam jet series 2a (FIGURE 3) in apparatus shown in FIGURES 2 and 4. Elastomer recovery at various conditions are shown in Table I.

Table I

| Run | Soln. feed rate, lbs. solid/hr. | Steam (ca 90-150 p.s.i.g.) lbs./hr | Steam Lbs./lb. of elastomer | Water temp., °F. | Driability [a] Initial Percent, VM | Time, Min. |
|---|---|---|---|---|---|---|
| A | 41.6 | 224 | 5.38 | 160 | 94 | 20 |
| B | 16.2 | 224 | 13.83 | 175 | 70 | 18 |
| C | 78.7 | 216 | 2.74 | 150 | 133 | 39 |
| D | 62.5 | 216 | 3.46 | 150 | | |
| E | 71.9 | 216 | 3.14 | 165 | 76 | 30 |
| F | 73.8 | 226 | 3.06 | 160 | 135 | 27 |

[a] Time required for 100 gms. of elastomer to reach 0.1% volatile matter (VM), mainly water, in a Dietert dryer operated at 180° F.

Table I shows that the proportion of steam to elastomer has an important effect upon the proportion of volatile matter left in the rubber crumb. Other conditions being equal. It is therefore preferred that the proportion of steam be at least about 4 parts by weight per part of elastomer and that the water temperature in the coagulation bath be at least about 165° F.

EXAMPLE II

The same procedures as in Example I are repeated except that the polyisoprene solution has an I.V. of 6.95 and a solids content of 19.5%. Elastomer recovery is shown in Table II.

Table II

| Run | Soln. feed rate, lbs. solid/hr. | Steam lbs./hr | Steam Lbs./lb. of elastomer | Water temp., °F. | Driability [a] Initial Percent, VM | Time, Min. |
|---|---|---|---|---|---|---|
| A | 20.4 | 220 | 10.78 | 180 | | |
| B | 29.2 | 104 | 3.56 | 160 | 57 | 33 |
| C | 49.0 | 104 | 2.12 | 160 | 46 | 27 |
| D | 51.6 | 96 | 1.86 | 190 | 90 | 24 |
| E | 51.6 | 81 | 1.58 | 180 | 80 | 27 |

[a] Time required for 100 gms. of elastomer to reach 0.1% volatile matter (VM), mainly water, in a Dietert dryer operated at 180° F.

In a large number of runs as shown in the above examples, it is determined that the molecular weight, or I.V., has little effect on the drying characteristic of this crumb and the same applied to the concentration of the elastomer solution. It is also noted that the temperature of the hot water bath effects the drying time of the crumb in order to produce a volatile content of .1% or less and as the hot water temperature increases the rate of drying tends to increase while the residual hydrocarbon content decreases. These variations will readily suggest what modifications can be made to produce a dry crumb with a volatile content of 1.0% or less.

The synthetic elastomers obtained by the copolymerization of ethylene and propylene are recovered in the same manner described for the recovery of the cis 1,4-polyisoprene. This is the case irrespective of the proportion of the respective monomers used in preparing the copolymer.

EXAMPLE III

A cement of polyisoprene was prepared, the solvent being mixed amylenes and the concentration of elastomer being about 13%. Coagulation was carried out by means of steam at several different pressures as indicated in Table III below. The driability of the crumb so prepared was determined by ascertaining the moisture content after drying for one hour at 175° F.

Table III

| Steam pressure (p.s.i.g.) | Coagulator pressure | Percent hydro-carbon in crumb | Percent moisture after 60 minutes at 175° F. |
|---|---|---|---|
| 93 | 6 | 0.20 | 0.13 |
| 94 | 20 | 0.14 | 0.37 |
| 40 | 10 | 3.1 | 7.8 |
| 47 | 20 | 3.0 | 11.8 |

EXAMPLE IV

Comparable coagulation tests were made with a benzene solution of polybutadiene. Pertinent comparative data are given in Table IV.

Table IV

| Run | Steam pressure, p.s.i.g. | Coagulator pressure, p.s.i.g. | Drying time, minutes | Percent benzene in crumb |
|---|---|---|---|---|
| F | 59 | 51 | 61 | 0.6 |
| G | 120 | 51 | 44 | |
| H | 132 | 51 | 21 | 0.16 |
| I | 125 | 53 | 17 | |

According to the data contained in Table III, it will be seen that steam pressure of slightly over 90 pounds produced a crumb having excellent driability characteristics, while the use of lower pressure steam produced a crumb having substantially poorer driability. Furthermore, the difference in hydrocarbon content of the crumb as produced under the several conditions is substantial as shown in the table.

The procedures and principles described above apply to the recovery of diene elastomers such as polyisoprene and cis 1,4-polybutadiene. Some modifications however may be desirable because of the nature of the solvents used in preparing the butadiene elastomer. In general, it is preferred that the cis 1,4-polybutadiene be prepared in a solvent containing at least 20% benzene and because of the higher boiling point of benzene, the temperature needed to volatilize the latter will be greater. One procedure is to carry out the coagulation in multiple stages whereby most of the solvent is removed in the first stage and then removing the rest in second or succeeding stages. Another procedure employs a combination of multiple stages and reduced temperatures and pressures. Still another procedure is to use a mixed solvent for the polymerization. Such a mixture comprises benzene, and a low boiling aliphatic solvent such as isopentane, pentane, butene, or the like.

The present invention will be found to be equally suitable for the recovery of other synthetic elastomers from hydrocarbon solutions thereof as the present invention solves the problem of removing hydrocarbon solvents from synthetic elastomers which tend to hold the solvent in a manner which makes removal quite difficult. Other synthetic elastomers which may be recovered by the processes of this invention include, for example, the elastomers of other conjugated dienes and other rubbery elastomers as ethylene-propylene copolymers and terpolymers wherein the third monomer is a diene such as divinylbenzene. The preparation of such elastomers are well known and they all, in common, are dissolved in a hydrocarbon solvent. While the solvent may be removed from the elastomer by other means, as by extruding or drum-drying, the present invention provides elastomer recovery which is more efficient and economical.

The hot water contained in the vessel where most of the solvent is vaporized merely needs to be at a temperature that is sufficiently high to vaporize the solvent at the process pressure. The minimum temperature is actually the temperature that will vaporize the solvent as the azeotrope formed from the water in the vessel and the solvent from the elastomer solution. In practice, the temperature will be higher than the minimum and the actual choice will likely be made when the capacity of the recovery system is determined. Because the processes of this invention are particularly suitable for recovery of great quantities of solvent and synthetic elastomer, economic considerations, especially in the temperature of the coagulation water, become fairly important.

From the foregoing examples and description it will be seen that the invention is capable of substantial modification in respect to the feed rate of the elastomer solution, the hot water temperatures, the viscosities of the elastomer solution and in other respects. Such modifications, however, will be fairly apparent to one skilled in the art in view of this specification.

This is a continuation-in-part of U.S. patent application Serial No. 802,128, filed March 26, 1959, now abandoned.

We claim as our invention:

1. A process for recovering a synthetic elastomer from its solution in a hydrocarbon solvent which comprises
   (1) feeding the solution in one orifice of a two fluid nozzle,
   (2) feeding steam at a pressure of between about 90–130 p.s.i.g. into a second orifice of said nozzle, whereby crumb is instantaneously formed and solvent instantaneously flashed off,
   (3) receiving the crumb in a water bath,
   (4) separating the crumb from the water, and
   (5) drying the crumb.

2. A processe according to claim 1 wherein the elastomer is diene rubber.

3. A process according to claim 2 wherein the rubber is a high cis 1,4-polyisoprene.

4. A process according to claim 2 wherein the rubber is polybutadiene.

5. A process according to claim 1 wherein the hydrocarbon solvent is a hydrocarbon having 4–6 carbon atoms per molecule.

6. A process according to claim 1 wherein the weight ratio of steam to elastomer is between about 3.5 and about 6.5.

References Cited by the Examiner

UNITED STATES PATENTS

| | | | |
|---|---|---|---|
| 2,451,332 | 10/48 | Green | 260—94.7 |
| 2,459,748 | 1/49 | Johnson | 260—94.7 |
| 2,953,556 | 9/60 | Wolfe et al. | 260—83.7 |
| 2,957,855 | 10/60 | McLeod | 260—94.7 |

JOSEPH L. SCHOFER, *Primary Examiner.*

LEON J. BERCOVITZ, *Examiner.*